(12) United States Patent
Bergfeld (10) Patent No.: US 11,886,207 B2
(45) Date of Patent: Jan. 30, 2024

(54) PRESSURE CONTROL VALVE AND DEVICE COMPRISING SUCH A PRESSURE CONTROL VALVE, FOR OPEN-LOOP OR CLOSED-LOOP CONTROL OF THE PRESSURE OF A PRESSURIZED FLUID IN A PILOT PRESSURE CHAMBER

(71) Applicant: KENDRION (VILLINGEN) GMBH, Villingen-Schwenningen (DE)

(72) Inventor: Björn Bergfeld, Balingen-Endingen (DE)

(73) Assignee: KENDRION (VILLINGEN) GMBH, Villingen-Schwenningen (DE)

( * ) Notice: Subject to any disclaimer, the term of this patent is extended or adjusted under 35 U.S.C. 154(b) by 317 days.

(21) Appl. No.: 17/438,633

(22) PCT Filed: Jan. 23, 2020

(86) PCT No.: PCT/EP2020/051613
§ 371 (c)(1),
(2) Date: Sep. 13, 2021

(87) PCT Pub. No.: WO2020/182358
PCT Pub. Date: Sep. 17, 2020

(65) Prior Publication Data
US 2022/0221883 A1    Jul. 14, 2022

(30) Foreign Application Priority Data
Mar. 14, 2019 (DE) .......................... 102019106494.5

(51) Int. Cl.
*G05D 16/00* (2006.01)
*G05D 16/20* (2006.01)
*F16F 9/46* (2006.01)

(52) U.S. Cl.
CPC .......... *G05D 16/2022* (2019.01); *F16F 9/465* (2013.01)

(58) Field of Classification Search
CPC ................................................ G05D 16/2022
See application file for complete search history.

(56) References Cited

U.S. PATENT DOCUMENTS 9,855,811 B2 * 1/2018 Murakami .............. F16F 9/516
11,267,310 B2 * 3/2022 Yamashita ............. B60G 21/06
(Continued)

FOREIGN PATENT DOCUMENTS

CN    105308352 A    2/2016
CN    107110275 A    8/2017
(Continued)

OTHER PUBLICATIONS

German office action dated Nov. 20, 2021, in corresponding German application No. DE 10 2019 106 494.5.
(Continued)

*Primary Examiner* — Kevin R Barss
(74) *Attorney, Agent, or Firm* — Nath, Goldberg & Meyer; Jerald L. Meyer (57) ABSTRACT

The present invention relates to a pressure control valve (30) for open-loop or closed-loop control of a pressure of a compressed fluid in a pilot pressure chamber (12), comprising a valve housing (50) with at least one inlet (41) which can be fluidically connected to the pilot pressure chamber (12), and at least one outlet (43); a wall section (51) which is permanently arranged in the pressure control valve (30) and which wall section has a passage channel (60) through which the compressed fluid can flow, and forms a first valve seat (58); a tappet (52) which is mounted in the valve housing (50) so as to be movable along a longitudinal axis (L) by means of an actuation device (49) that can be energized; a first sealing element (54) which forms a second valve seat (66), is mounted in the valve housing (50) so as to be movable along the longitudinal axis (L) and is biased by means of a first spring (56) against the actuation direction (B) of the actuation device (53) into a closure position in which the first sealing element (54) bears against the first valve seat (58) and can be moved by the compressed fluid in the actuation direction (B); and a second sealing element (64) which is attached to the tappet (52), the second valve seat (66) being arranged axially offset to the first valve seat (58) with respect to the longitudinal axis (L), and a second spring (68), which biases the second sealing element (64) into the first position.

17 Claims, 5 Drawing Sheets

(56) References Cited

U.S. PATENT DOCUMENTS

2016/0090146 A1    3/2016  Murakami et al.
2018/0355941 A1   12/2018  Yuno et al.
2022/0145996 A1*   5/2022  Bergfeld .................. F16K 1/42

FOREIGN PATENT DOCUMENTS

DE   102010046833 A1   4/2011
EP        0499183 A2   8/1992
EP        2492534 A1   8/2012
WO     2005121918 A1  12/2005

OTHER PUBLICATIONS

Office Action dated Jul. 28, 2022, in parallel Chinese patent application No. 202080020390.2.

* cited by examiner

PRESSURE CONTROL VALVE AND DEVICE COMPRISING SUCH A PRESSURE CONTROL VALVE, FOR OPEN-LOOP OR CLOSED-LOOP CONTROL OF THE PRESSURE OF A PRESSURIZED FLUID IN A PILOT PRESSURE CHAMBER

This is a National Phase Application filed under 35 U.S.C. 371 as a national stage of PCT/EP2020/051613, filed Jan. 23, 2020, an application claiming the benefit of German Application No. 10 2019 106 494.5 filed Mar. 14, 2019, the content of each of which is hereby incorporated by reference in its entirety.

The present invention relates to a pressure control valve for open-loop or closed-loop control of a pressure of a compressed fluid in a pilot pressure chamber. The invention also relates to a device with such a pressure control valve, with which the pressure of the compressed fluid in the pilot pressure chamber can be regulated.

Hydraulic fluids or compressed air are usually used as compressed fluids. Pilot pressure chambers in hydraulically or pneumatically operated devices are used for open-loop or closed loop control of pilot-operated valves, which often are also designed as hydraulic or pneumatic sliders. If pilot-operated valves are designed as proportional valves or proportional sliders, the volume flows that flow through the proportional valve or the proportional slider can be, within certain limits, continuously adjusted with the pressure in the pilot pressure chamber.

An example of such hydraulically or pneumatically operated devices are vibration dampers in motor vehicles, in which the damping characteristic depends on the volume flow of the compressed fluid used flowing through the proportional valve. Depending on the volume flow, a more comfort-oriented, softer damping or a sportier, harder damping can be set. In the case of vibration dampers, an actuation device that can be energized is used, with which several damping characteristics can be specified by the driver or automatically set by an on-board computer depending on the driving condition of the motor vehicle or the condition of the ground surfacing along which the motor vehicle is currently moving. However, it must be ensured that in the event of a failure of the electrical energy and consequently the failure of the actuation device, a fail-safe device, also referred to as a "failsafe", is available. This ensures that the vehicle can continue to be operated with a certain damping characteristic even in the event of a failure of the electrical energy. A medium damping characteristic that is neither too hard nor too soft is usually aimed for here.

These requirements result in a relatively complex structure of the device, in particular the vibration damper, as can be seen, for example, from US 2016/0091044 A1 and WO 2016/066314 A1. The structure becomes particularly complex because a plurality of sliders have to be used. Further vibration dampers are disclosed in US 2016/0369862 A1, JP 2009-115319 A, U.S. Pat. No. 5,147,018 A, WO 2011/023351 A1 and US 2005/0016086 A1. In particular, the vibration damper disclosed in EP 2 678 581 B1 also offers a medium damping characteristic in "fail-safe" mode.

The object of one embodiment of the present invention is to provide a pressure control valve for closed-loop control of a pressure of a compressed fluid in a pilot pressure chamber, which is simple in structure and regulates the pressure in the pilot pressure chamber to a determinable level even when there is no electrical energy to energize the actuation device. Furthermore, it is the object of one embodiment of the present invention to create a device, with which the pressure of the compressed fluid in the pilot pressure chamber can be regulated and which can be operated with such a pressure control valve.

This object is achieved with the features specified in claims 1 and 14. Advantageous embodiments are the subject of the dependent claims.

One embodiment of the invention relates to a pressure control valve for closed-loop control of a pressure of a compressed fluid in a pilot pressure chamber, comprising
 a valve housing with at least one inlet, which can be fluidically connected to the pilot pressure chamber, and at least one outlet,
 a wall section which is securely arranged in the pressure control valve and which
  has a passage channel through which the compressed fluid can flow, and
  which forms a first valve seat,
 a tappet, which is mounted in the valve housing so as to be movable along a longitudinal axis by means of an actuation device that can be energized,
 a first sealing element, which
  forms a second valve seat,
  is mounted in the valve housing so as to be movable along the longitudinal axis and
  is biased by means of a first spring against the actuation direction of the actuation device into a closure position in which the first sealing element bears against the first valve seat and can be moved by the compressed fluid in the actuation direction,
 a second sealing element, which is secured to the tappet and, by energizing the actuation device, can be moved by means of the tappet along the longitudinal axis between a first position, in which the second sealing element bears against the wall section and closes the passage channel, and a second position, in which the second sealing element bears against the second valve seat, the second valve seat being arranged axially offset to the first valve seat with respect to the longitudinal axis, and
 a second spring, which biases the second sealing element into the first position.

The essential property of the proposed pressure control valve is that it has at least two valve seats, through which the compressed fluid can flow when the respective valve seat is open. The pressure control valve is designed in such a way that the compressed fluid can flow through the pressure control valve when at least one of the valve seats is open. In this respect, the first valve seat and the second valve seat are connected in parallel to one another in relation to the opening behavior.

While the second valve seat can be opened and closed directly or indirectly as a result of the actuation device being energized and the resulting movement of the second sealing element, the first valve seat is opened due to the pressure acting in the pressure control valve. In other words, the second valve seat is actively opened by being energized, while the first valve seat is passively opened due to the prevailing pressure conditions. The second spring ensures that the passage channel is closed if the actuation device fails.

This has the consequence that even if the electrical energy for energizing the actuation device is not available, a flow through the pressure control valve is possible. The pressure in the pilot pressure chamber can therefore be open-loop or closed-loop controlled even if the power supply fails, so that a fail-safe device, also referred to as a "failsafe", can be provided with just a single pressure control valve. The damping characteristic that arises in the event of the fail-safe is determined by the choice of the spring constant and the spring bias of the first spring.

The pressure control valve can also be closed when the second sealing element is in the second position and the second sealing element bears against the second valve seat. Then, however, no flow through the pressure control valve and therefore neither open-loop or closed-loop control of the pressure in the pilot pressure chamber is possible, so that the second sealing element is usually not moved into the second position when the pressure control valve is in operation.

The first valve seat and the second valve seat are arranged axially offset from one another with respect to the longitudinal axis in order to be able to ensure the movability of the second sealing element along the longitudinal axis. The provision of the second sealing element for throttling enables the opening points and the desired damping characteristics to be set very precisely. In the pressure control valve disclosed in EP 2 678 581 B1, the throttling and the opening and closing of the valve seats are carried out with the tappet. The pressure control valve shown there does not have a second sealing element. As a result, the desired damping characteristics cannot be set as precisely as with the present pressure control valve. In addition, with the present pressure control valve, the damping characteristics can be changed in a simple manner by using a second sealing element with different dimensions. In the case of the pressure control valve disclosed in EP 2 678 581 B1, the entire tappet has to be changed for this, which is significantly more complex.

Contrary to the pressure control valve disclosed in EP 2 678 581 B1, the proposed pressure control valve does not have a movable valve chamber with a movable wall section. Rather, the wall section is securely connected to the valve housing. As a result, the damping characteristics can be adjusted more precisely. In addition, the mounting of the movable components is simplified compared to the pressure control valve disclosed in EP 2 678 581 B1.

According to another embodiment, the first sealing element has a first surface to which the compressed fluid can be applied and which points away from the wall section, and a second surface to which the compressed fluid can be applied and which points toward the wall section, the second surface being larger than the first surface. In the event that no electrical energy is available for energizing the actuation device, the second sealing element is moved by means of the second spring into the first position, in which the second sealing element closes the passage channel. As a result, the compressed fluid cannot flow through the passage channel, so that a pressure builds up upstream of the second sealing element, which acts both on the first surface and on the second surface of the first sealing element. Due to the fact that the second surface is larger than the first surface, but the same pressure acts on both the first surface and the second surface, the compressed fluid applies a fluid force to the first sealing element, which acts in the actuation direction of the actuation device and thus against the bias of the first spring. The first sealing element is therefore moved along the actuation direction until a force equilibrium is established between the bias of the first spring and the fluid force applied by the compressed fluid to the first sealing element. The first valve seat is opened so that the compressed fluid can flow through it. Consequently, a flow through the pressure control valve is made possible even if there is no electrical energy for operating the actuation device ("failsafe").

According to a further embodiment, the second valve seat is formed by a tube arranged in the first sealing element. In particular, if structural changes are to be made to the pressure control valve that require a different positioning of the second valve seat, only the diameter and/or the length of the tube and the corresponding receptacle in the first sealing element need to be changed. The valve housing itself can remain unchanged.

According to a further developed embodiment, the tube is connected to the first sealing element so as to be movable along the longitudinal axis. It is advantageous here to connect the tube to the first sealing element by means of a frictional connection, for example by means of a certain interference with said sealing element, so that the position of the second valve seat is clearly retained when the pressure control valve is in operation. However, the frictional connection can be overcome with suitable tools during the assembly of the pressure control valve, so that the position of the second valve seat can be adjusted. In this way, magnetic forces, which can be different as a result of tolerance differences, can be standardized. Opening points that deviate from the target value due to manufacturing tolerances can be corrected in a relatively simple manner.

According to a further embodiment, the passage channel is formed by an annular gap between the wall section and the tappet. In this embodiment, the passage channel can be implemented in a structurally simple manner.

According to a further developed embodiment, the wall section has a through-hole through which the compressed fluid can flow and which cannot be closed by the first sealing element. The through-hole is used for guiding the compressed fluid downstream of the first valve seat, i.e., after the pressure of the compressed fluid has been adjusted to the desired level. As a result, it is possible to guide the compressed fluid through the pressure control valve with short paths, which requires few structural changes.

According to a further developed embodiment, the cross-sectional area of the passage channel or of the annular gap is larger than the cross-sectional area of a throttle gap originating from the second sealing element. The above-mentioned open-loop or closed loop control of the pressure in the pilot pressure chamber takes place essentially by throttling the flow of the compressed fluid in the pressure control valve. The amount of throttling is determined by the smallest cross-section through which fluid can flow. When flowing through the pressure control valve, the compressed fluid passes essentially two cross-sections, namely on the one hand the annular gap and on the other hand the throttle gap formed by the second sealing element or the tappet. While the annular gap is structurally predetermined and its cross-sectional area cannot be changed, the cross-sectional area of the throttle gap can be changed as a result of a stronger or less strong energization of the actuation device. Due to the fact that the cross-sectional area of the throttle gap in every position of the tappet is smaller than the cross-sectional area of the annular gap or of the passage channel, it is ensured that the pressure in the pilot pressure chamber can be changed by energizing the actuation device.

According to a further developed embodiment, the cross-sectional area of the first annular gap and of the second is larger than the cross-sectional area
  of the first throttle gap formed between the second sealing element and the second valve seat, or
  of the second throttle gap formed between the second sealing element and the first sealing element, or
  of the third throttle gap formed between the second sealing element and the wall section.

If the second sealing element is located between the first position and the second position, the compressed fluid is initially directed radially outward by the second sealing element, seen in the flow direction, then parallel to the longitudinal axis and then radially inward again. If the compressed fluid flows radially outward, it flows through a first throttle gap extending parallel to the longitudinal axis. When flowing parallel to the longitudinal axis, the compressed fluid flows through a second throttle gap, whereas it flows through a third throttle gap when flowing radially inward. The first throttle gap is formed between the second sealing element and the second valve seat. The second throttle gap is formed between the second sealing element and the first sealing element, whereas the third throttle gap is formed between the second sealing element and the wall section.

Depending on the position of the second sealing element, the cross sections of the first and the third throttle gap change. The throttle gap which has the smallest cross-sectional area should be referred to as the active throttle gap, since this determines the degree of throttling of the flow of the compressed fluid. The pressure control valve is designed in such that, regardless of the position of the tappet, the cross-sectional area of the annular gap is larger than the cross-sectional area of the active throttle gap. As a result, it is ensured that the pressure in the pilot pressure chamber can be changed by energizing the actuation device.

According to a further embodiment, the pressure control valve is designed as a proportional valve. In this embodiment, the volume flow through the pressure control valve can be regulated in the following way: as mentioned, the second sealing element can be moved back and forth between the first position and the second position by means of the actuation device. The proportional valve is designed in such that the throttle gap changes linearly, so that the volume flow is also changed linearly. The pressure in the pilot pressure chamber can therefore be controlled proportionally to the energization of the actuation device.

In a further embodiment, the wall section can be designed as a first spring plate and/or the second sealing element as a second spring plate. In this embodiment, the wall section and the second sealing element are sufficiently stable with a low wall thickness as well as comparatively simple to manufacture.

According to a further developed embodiment, the second sealing element is connected to the tappet by means of a clearance fit. This allows tolerances to be compensated for in a simple manner.

A further developed embodiment is characterized in that the spring plate is press-fit on the tappet. In this way, sufficient fastening of the spring plate on the tappet can be achieved in a simple manner.

According to a further embodiment, the actuation device comprises a magnet through which the compressed fluid can flow. Actuation devices which use magnets to move a tappet are common, so that such actuation devices can be used when manufacturing the present pressure control valve. If the compressed fluid can flow through the magnet, however, there is the advantage that the compressed fluid acts as a coolant, since it can dissipate at least some of the heat from the magnet that is generated during operation of the magnet. This reduces the thermal load on the magnet and increases its durability.

One embodiment of the invention relates to a device for open-loop control of or closed-loop control of a pressure in a pilot pressure chamber, comprising
  a primary circuit for a compressed fluid,
  a working machine arranged in the primary circuit for conveying the compressed fluid in the primary circuit along a conveying direction,
  a hydraulic or pneumatic slider,
  a secondary circuit for the compressed fluid,
    which starts from a branch of the primary circuit, which branch is arranged downstream of the working machine with respect to the conveying direction, and
    which flows back into the primary circuit at a junction,
  a pilot pressure chamber arranged in the secondary circuit, and
  a pressure control valve according to one of the previous embodiments, arranged between the pilot pressure chamber and the junction in the secondary circuit, wherein
  the slider is arranged and designed so that the slider can block or unblock the flow of the compressed fluid in the primary circuit between the branch and the junction depending on the pressure in the pilot pressure chamber.

The advantages and technical effects that can be achieved with the proposed device correspond to those that have been explained with the pressure control valve according to one of the previously discussed embodiments. In summary, it should be pointed out that with only one pressure control valve and only one slider, both active and passive control of the pressure in the pilot pressure chamber can be achieved and the structural complexity of the device can be kept low.

According to a further embodiment, the slider is designed as a proportional slider. In a closed position, the slider blocks the primary circuit between the branch and the junction depending on the pressure in the pilot pressure chamber. In this case, the compressed fluid can only flow from the branch to the junction via the secondary circuit. As soon as the pressure in the pilot pressure chamber is exceeded or not reached, depending on the design of the device, the slider is moved into an open position so that the fluid can also flow between the branch and the junction in the primary circuit. However, simple sliders can only be moved between the open position and the closed position, so that the flow of the compressed fluid between the branch and the junction in the primary circuit is either completely unblocked or blocked. However, if the slider is designed as a proportional slider, the volume flow of the compressed fluid between the branch and the junction in the primary circuit can be adjusted depending on the pressure in the pilot pressure chamber. Since the pressure in the pilot pressure chamber can in turn be adjusted with the energization of the actuation device, the volume flow of the compressed fluid between the branch and the junction in the primary circuit can accordingly also be adjusted with the energization of the actuation device and at the same time a fail-safe can be realized in the event that the actuation device fails.

Another embodiment is characterized in that the actuation device of the pressure control valve comprises a magnet through which the compressed fluid can flow and in that the magnet is fluidically connected to the pilot pressure chamber or to an external compressed fluid circuit. As mentioned, actuation devices which use magnets to move a tappet are widespread, so that such actuation devices can be used. If the compressed fluid can flow through the magnet, however, there is the advantage that the compressed fluid acts as a coolant, since it can dissipate at least some of the heat from the magnet that is generated during operation of the magnet. This reduces the thermal load on the magnet and increases its durability.

If the magnet is fluidically connected to the pilot pressure chamber, the pressure prevailing there can be used as the delivery pressure for the compressed fluid, so that no further delivery elements have to be used. The construction of the device is not significantly complicated. In the event that the magnet is fluidically connected to an external compressed fluid circuit, the volume flow through the magnet can be changed independently of the volume flow and the pressure conditions in the secondary circuit.

Another embodiment is characterized in that the working machine is a pump, a compressor or a vibration damper. The vibration dampers can be designed as two-tube or three-tube vibration dampers. Such working machines can be open-loop or closed-loop controlled particularly well in a simple manner by means of the proposed device as a result of the regulation in the pilot pressure chamber. In the event that the working machine is designed as a vibration damper, the damping characteristics can be adjusted by energizing the actuation device so that harder or softer damping results. If the actuation device fails, damping is also ensured, which depends on the spring bias and the spring constant of the first spring.

Figure 1:
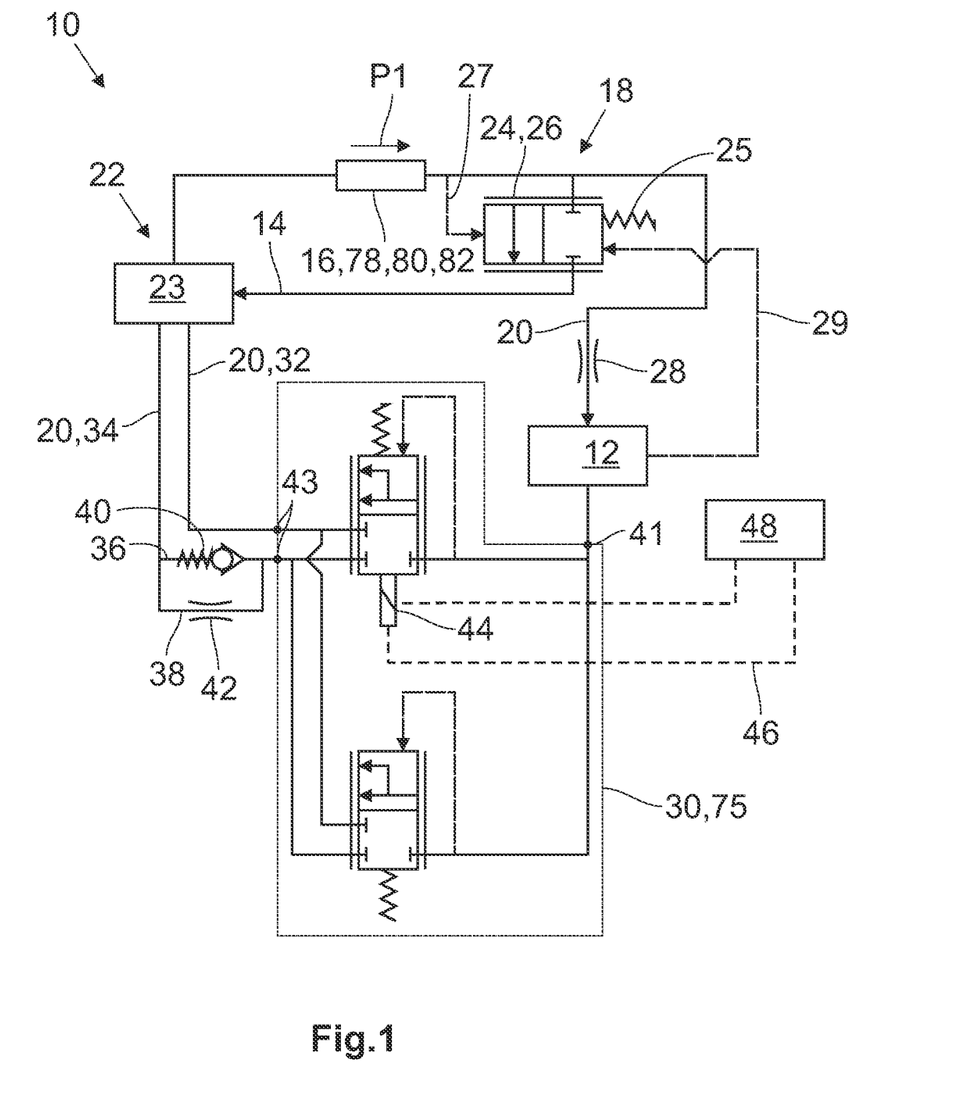
FIG. 1 is a circuit diagram of an embodiment of a proposed device for open-loop control of or closed-loop control of a pressure of a compressed fluid in a pilot pressure chamber.

FIG. 1 shows a circuit diagram of a device 10 for open-loop or closed-loop control of a pressure of a compressed fluid in a pilot pressure chamber 12. A hydraulic fluid or compressed air can be used as the compressed fluid, the following description relating to a compressed fluid which is designed as a hydraulic fluid. The device 10 comprises a primary circuit 14 in which the compressed fluid can be conveyed by means of a working machine 16. A working machine 16 is to be understood as a component with which, in particular, mechanical work can be transferred to the compressed fluid in such that it is conveyed in the primary circuit 14 in the conveying direction indicated by the arrow P1.

In relation to the conveying direction indicated by the arrow P1, a branch 18 is arranged downstream of the working machine 16, from which a secondary circuit 20 starts, through which the compressed fluid can likewise flow. The exact configuration of the secondary circuit 20 will be discussed in greater detail later.

Downstream of the branch 18, a junction 22 is provided in the primary circuit 14, at which the secondary circuit 20 enters again into the primary circuit 14. In the example shown, the junction 22 is realized by means of a low-pressure chamber 23.

Starting from the low-pressure chamber 23, the primary circuit 14 flows back into the working machine 16.

As can be seen from FIG. 1, a slider 24 is arranged downstream of the branch 18, which in the illustrated embodiment is designed as a proportional slider 26 which interacts with a spring 25. The secondary circuit 20 cannot be blocked by the slider 24. The slider 24 is adjustable between two positions, wherein in a first position, which is shown in FIG. 1, the slider 24 blocks the primary circuit 14 between the branch 18 and the junction 22. In the second position, on the other hand, the fluid connection between the branch 18 and the junction 22 in the primary circuit 14 is provided. The slider 24 is designed as a 2/2 valve.

The spring 25 interacts with the slider 24 in such a way that it is biased into the first position. A first control line 27, which is connected to the slider 24, extends between the working machine 12 and the branch 18. Furthermore, a second control line 29 extends from the pilot pressure chamber, which, like the first control line 27, is also connected to the slider 24. The compressed fluid conveyed to the slider 24 via the first control line 27 acts in the opposite direction on the slider 24 compared to the compressed fluid conveyed via the second control line 29 to the slider 24. The compressed fluid conveyed to the slider 24 via the second control line 29 acts in the same direction as the spring 25.

Starting from the branch 18, a throttling main orifice 28 is provided downstream of the slider 24 in the secondary circuit 20. The secondary circuit 20 then enters into the already mentioned pilot pressure chamber 12.

Downstream of the pilot pressure chamber 12 a pressure control valve 30 is arranged, the function of which can be understood as a solenoid-controlled 3/2 valve and a purely hydraulically controlled 3/2 valve connected in parallel thereto. The exact structural design of the pressure control valve 30 will be discussed in greater detail later.

Downstream of the pressure control valve 30, a first line 32 extends directly to the low-pressure chamber 23, while a second line 34 splits into a first sub-line 36 and a second sub-line 38, with a check valve 40 arranged in the first sub-line 36 and a secondary orifice 42 arranged in the second sub-line 38. The check valve 40 and the secondary orifice 42 are connected in parallel to one another. Downstream of the check valve 40 and the secondary orifice 42, the first sub-line 36 and the second sub-line 38 merge again. From there, the second line 34, like the first line 32, leads to the low-pressure chamber 23. As already mentioned, the secondary circuit 20 in the low-pressure chamber 23 enters again into the primary circuit 14.

As already mentioned, the proposed pressure control valve 30 can be understood in terms of its function as a solenoid-controlled 3/2 valve and a pressure-controlled 3/2 valve connected in parallel thereto, which in the example shown comprises an inlet 41 and two outlets 43. As will be apparent from the explanations below, the pressure control valve 30 can be operated as a 3/3 valve. However, it is also possible to design the pressure control valve 30 in such a way that its function can be interpreted as a solenoid-controlled 2/2 valve and a pressure-controlled 2/2 valve connected in parallel thereto. In this case, the pressure control valve 30 has one inlet 41 and only one outlet 43. Instead of the first line 32 and the second line 34, there is then only one common line (not shown).

In the example shown, the solenoid-controlled valve has a magnet 44 through which the compressed fluid, in this case the hydraulic fluid, can flow. However, it is just as possible to design the magnet 44 in such a way that no fluid can flow through it. In the exemplary embodiment shown in FIG. 1, the magnet 44 is connected to an external compressed fluid circuit 46, which has a feed pump 48 for conveying the compressed fluid in the external compressed fluid circuit 46. An embodiment in which the magnet 44 is fluidically connected to the primary circuit 14 and/or secondary circuit 20 is not shown. For example, the magnet 44 can be fluidically connected to the pilot pressure chamber 12 and the low-pressure chamber 23.

Figure 2A:
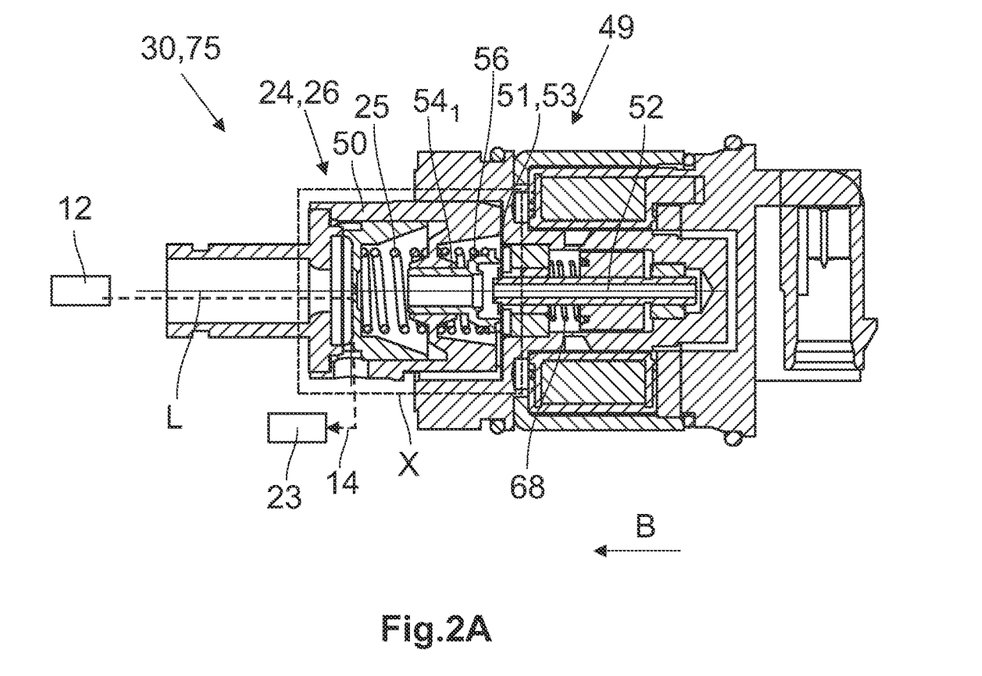
FIG. 2A is a sectional view through an embodiment of a proposed pressure control valve.

In FIG. 2A, an embodiment of the proposed pressure control valve 30 is shown as a sectional view. The section X marked in FIG. 2A is shown enlarged in FIGS. 2B and 3A. Consequently, the following description relates both to FIG. 2A and to FIGS. 2B and 3A. To facilitate understanding, the pilot pressure chamber 12 and the low-pressure chamber 23 are also shown in FIGS. 2A and 3A.

The pressure control valve 30 comprises a valve housing 50, in which the above-mentioned slider 24 is arranged on the left with respect to the chosen illustration in FIG. 2A. In addition, the primary circuit 14, which can be opened or closed by the slider 24, is indicated in FIG. 2A.

Furthermore, the pressure control valve 30 comprises a tappet 52, which is mounted in the valve housing 50 so as to be movable along a longitudinal axis L and can be moved along a movement direction B by means of an actuation device 49 that can be energized. The movement direction B extends in parallel with the longitudinal axis L. In the following, valve housing 50 should be understood to mean all components which in any way form walls and cavities of the pressure control valve 30. The valve housing 50 can have a plurality of such components.

In addition, a wall section 51 is permanently arranged in the pressure control valve 30 and forms a passage channel 60 (FIG. 3A) through which the compressed fluid can flow and which is designed as an annular gap 62. The annular gap 62 is formed between the wall section 51 and the tappet 52. The wall section 51 also forms a first valve seat 58 and, in the illustrated embodiment, is designed as a first spring plate 53. In addition, the wall section 51 has at least one through-hole 73 which will be discussed in more detail below.

Figure 2B:
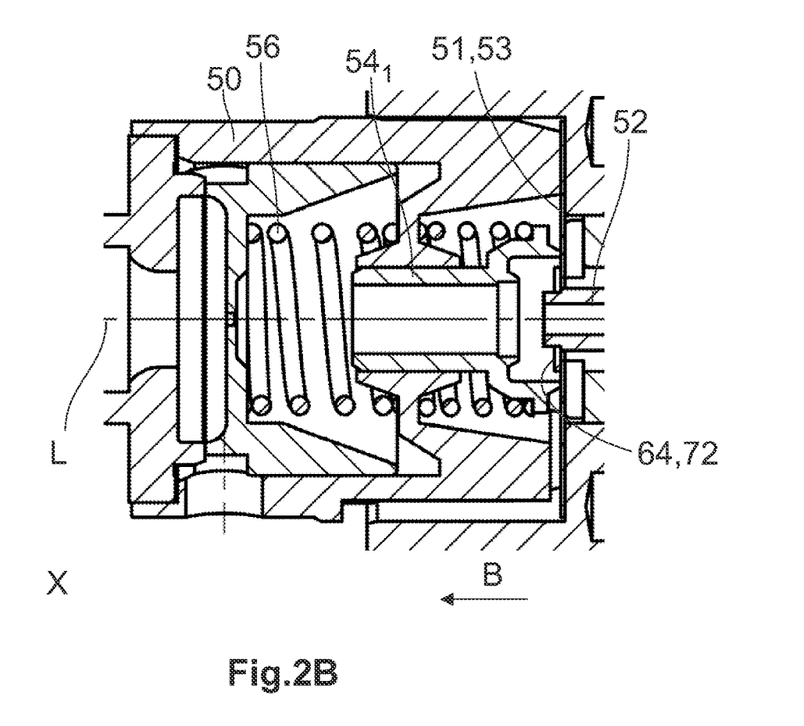
FIG. 2B is an enlarged illustration of the section X marked in FIG. 2A.
Figure 2C:
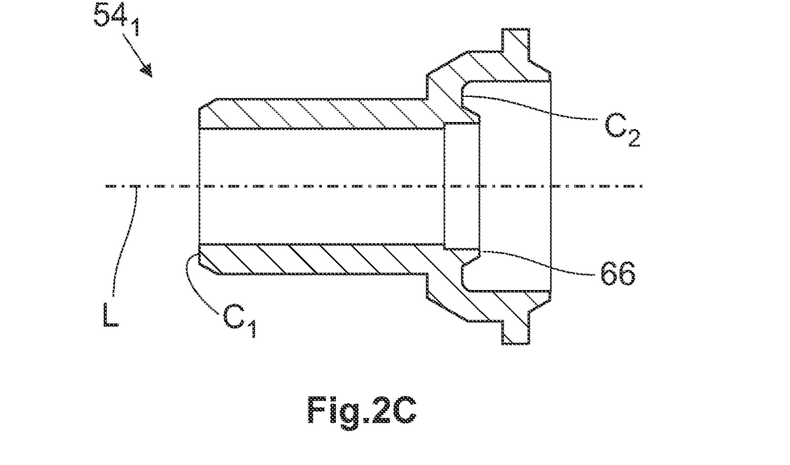
FIG. 2C is a separate illustration of the first sealing element.
Figure 3A:
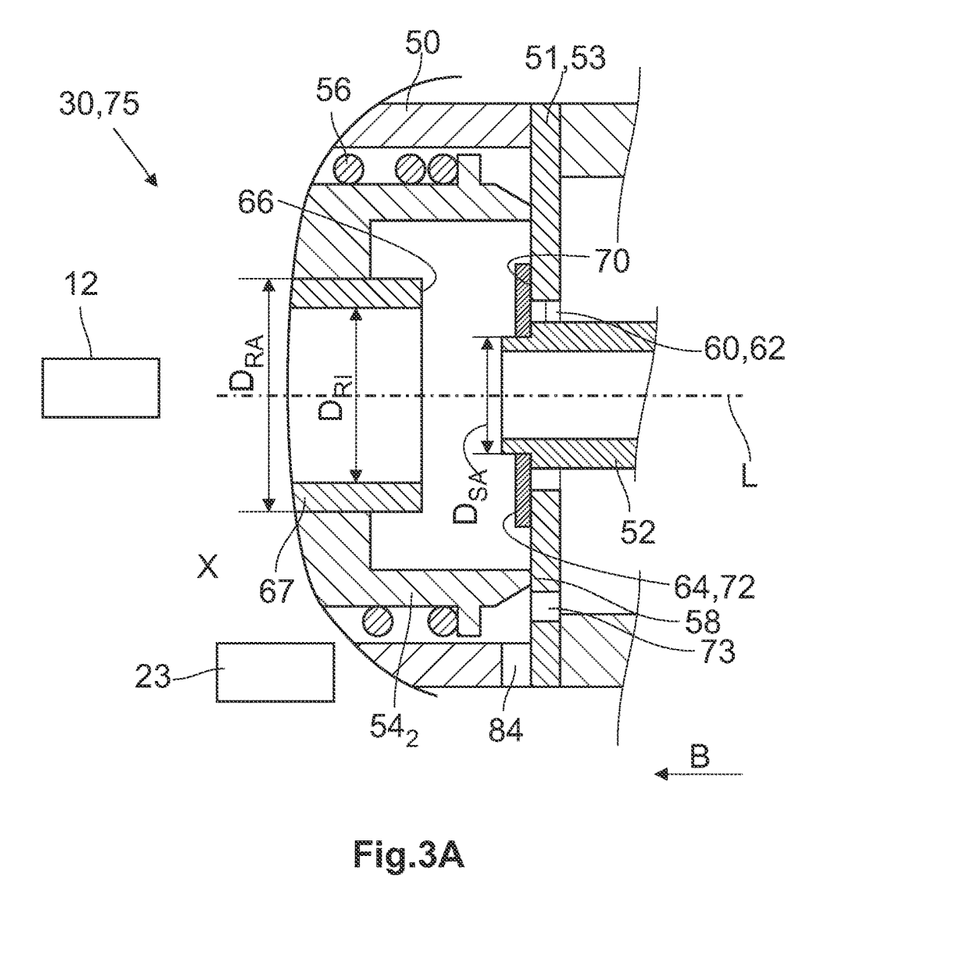
FIG. 3A is a basic and not-to-scale enlarged illustration of part of the section X marked in FIG. 2A, in which the pressure control valve is in a first operating state.

The pressure control valve 30 shown in FIGS. 2A to 2C has a first sealing element $54_1$ according to a first exemplary embodiment, which is likewise mounted in the valve housing 50 so as to be movable along the longitudinal axis L. The first sealing element 54 is biased by means of a first spring 56 against the valve seat 58 (see FIG. 3A), which is formed by a wall section 51 permanently connected to the valve housing 50.

Figure 3B:
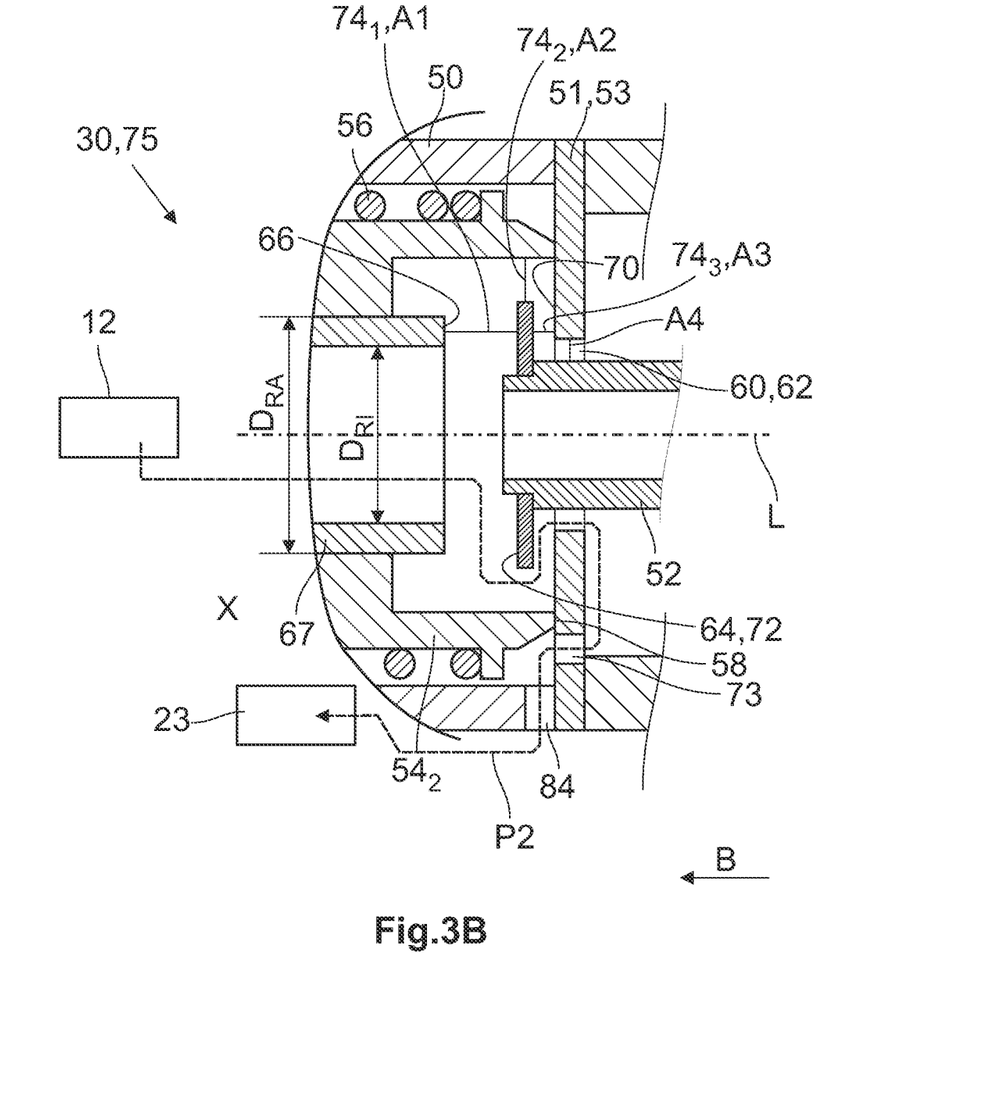
FIG. 3B is a basic and not-to-scale enlarged illustration of part of the section X marked in FIG. 2A, in which the pressure control valve is in a second operating condition.
Figure 3C:
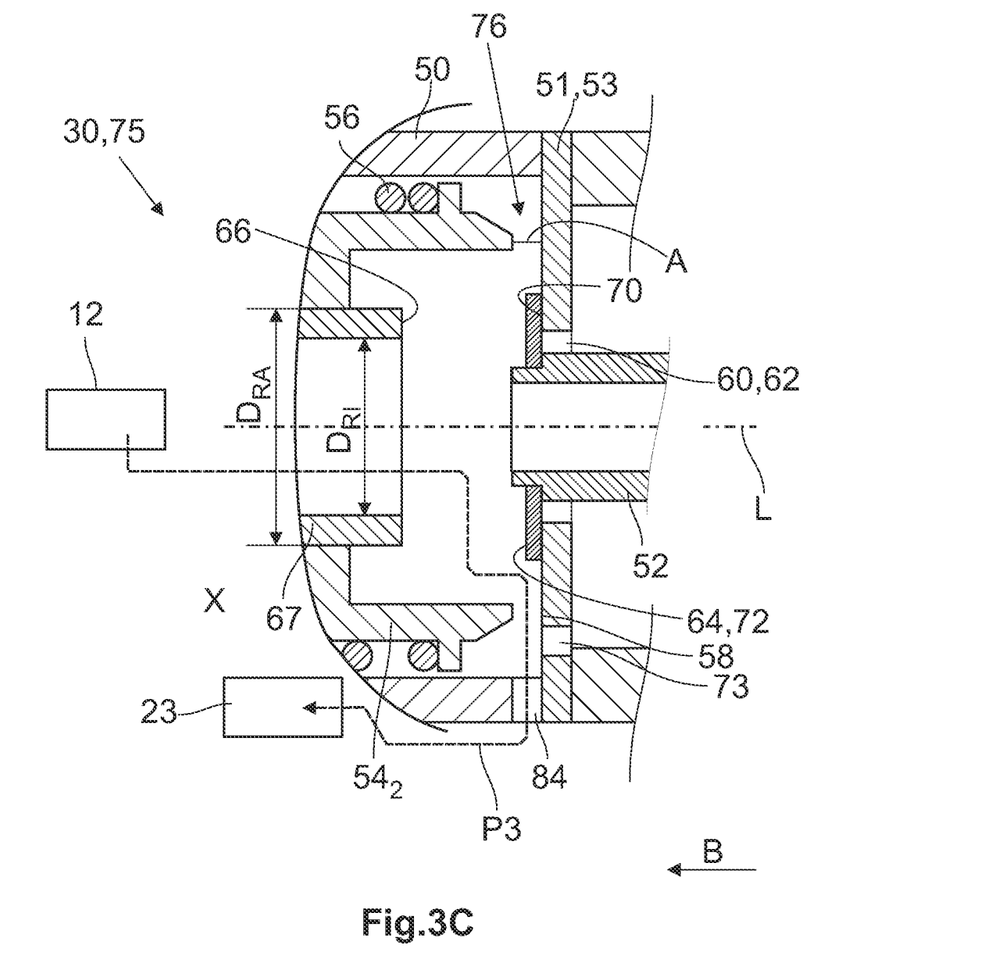
FIG. 3C is a basic and not-to-scale enlarged illustration of part of the section X marked in FIG. 2A, in which the pressure control valve is in a third operating condition.

In addition, the proposed pressure control valve 30 shown comprises a second sealing element 64 (see FIGS. 2B and 3A) which is attached to the tappet 52 and can be moved by means of the tappet 52 along the longitudinal axis L between a first position, in which the second sealing element 64 bears against the wall section 51 and closes the passage channel 60 (see FIGS. 2B and 3A), and a second position, in which the second sealing element 64 bears against a second valve seat 66 (not shown). As can be seen in particular from FIG. 2C, the second valve seat 66 is formed by the first sealing element $54_1$ according to the first exemplary embodiment. FIGS. 3A to 3C show a second exemplary embodiment of the first sealing element $54_2$, which differs in particular from the first sealing element $54_1$ according to the first exemplary embodiment in that the second valve seat 66 is formed by a tube 67 which is connected to the first sealing element $54_2$ to form a frictional connection. As a result, the tube 67 can be moved along the longitudinal axis L when a sufficiently large force is applied to the tube 67. When the tube 67 is moved, the position of the second valve seat 66 also changes, as a result of which the opening points of the pressure control valve 30 can be easily changed.

As can be seen from FIG. 3A, the tube 67 has an inside diameter $D_{RI}$ and an outside diameter $D_{RA}$. In addition, the tappet 52 has an outside diameter $D_{SA}$ at the end pointing toward the tube 67. In the embodiment shown of the pressure control valve 30, the outside diameter $D_{SA}$ of the tappet 52 is smaller than the inside diameter $D_{RI}$ of the tube 67. An embodiment in which the outside diameter $D_{SA}$ of the tappet 52 is larger than the inside diameter $D_{RI}$ but smaller than the outside diameter $D_{RA}$ of the tube 67, is not shown.

The pressure control valve 30 furthermore comprises a second spring 68 (see FIG. 2A), which interacts with the tappet 52 in such that the second sealing element 64 is biased into the first position and is consequently pressed against the wall section 51. In this respect, the wall section 51 forms a third valve seat 70 for the second sealing element 64.

The second sealing element 64 is designed as a second spring plate 72, which is fastened to the tappet 52 by means of a clearance fit. The clearance fit is designed in such a way that the spring plate 72 can be moved to a minimal extent both along the longitudinal axis L and perpendicular thereto. The fastening can take place by press-fitting the tappet 52 at the end. The spring plate 72 has a thickness of 0.1 to 0.5 mm.

In FIGS. 2A, 2B and 3A, the pressure control valve 30 is in a first operating state, while the pressure control valve 30 in FIG. 3B and FIG. 3C, which analogously represent part of the section X marked in FIG. 2A, is in a second and third operating state, respectively.

In FIG. 3A, the device 10 is in the unpressurized state, in which the first sealing element $54_2$ is pressed against the wall section 51 and the first valve seat 58 by means of the first spring 56, and the second sealing element 64 is pressed against the wall section 51 and the third valve seat 70 by means of the second spring 68. Consequently, the compressed fluid cannot flow through the pressure control valve 30, so that the second valve seat 66 is also closed indirectly. The through-hole 73 is located radially outside the first valve seat 58 so that it cannot be closed by the first sealing element 58.

In FIG. 3B, the pressure control valve 30 is in a second operating condition, which corresponds to the intended operation of the pressure control valve 30. Due to the energization of the actuation device 49, the tappet 52 is moved along the actuation direction B, which points left with respect to FIGS. 2 to 3C and extends in parallel with the longitudinal axis, as a result of which the second sealing element 64 moves away from the wall section 51 and from the third valve seat 70, and consequently no longer closes the passage channel 60. The compressed fluid, which is conveyed by the working machine 16 through the secondary circuit 20, can consequently flow through the pressure control valve 30, as indicated by the arrow P2 in FIG. 3B, and thus reach the low-pressure chamber 23. The compressed fluid flows through the above-mentioned through-hole 73 and a through-opening 84 arranged in the housing 50.

Based on a flow directed parallel to the longitudinal axis L, when entering the pressure control valve 30 and after flowing through the second valve seat 66, the compressed fluid is first deflected radially outward by the second sealing element 64 and must flow through a first throttle gap $74_1$. The compressed fluid is then deflected in such a way that it flows substantially parallel to the longitudinal axis L and has to flow through a second throttle gap $74_2$. Thereafter, the compressed fluid is deflected radially inward, so that it flows through a third throttle gap $74_3$ before it enters the passage channel 60 with a flow directed substantially parallel to the longitudinal axis L. After the compressed fluid has flowed through the passage channel 60, as well as through the through-hole 73 and the through-opening 84, it enters the low-pressure chamber 23.

The outside diameter $D_{SA}$ of the tappet 52 is smaller than the inside diameter $D_{RI}$ of the tube 67. As a result, the first throttle gap $74_1$ is formed starting at the second sealing element 64. In an embodiment that is not shown, in which the outside diameter $D_{SA}$ of the tappet 52 at the end pointing toward the tube 67 is larger than the inside diameter $D_{RI}$ but smaller than the outside diameter $D_{RA}$ of the tube 67, the first throttle gap $74_1$ starts at the tappet 52.

The second throttle gap $74_2$ and the third throttle gap $74_3$ start at the second sealing element 64. The first throttle gap $74_1$ has a first cross-sectional area A1 extending substantially parallel to the longitudinal axis L and which cross-sectional area is formed between the second valve seat 66 and the tappet 52. The second throttle gap $74_2$ forms a second cross-sectional area A2 extending substantially perpendicular to the longitudinal axis L and which cross-sectional area extends between the second sealing element 64 and the first sealing element $54_2$. The third throttle gap $74_3$ has a third cross-sectional area A3 extending substantially parallel to the longitudinal axis L and which cross-sectional area is formed between the second sealing element 64 and the wall section 51 and in particular the third valve seat 70.

A comparison of FIG. 3A and FIG. 3B shows that before the start of the energization, the third cross-sectional area A3 is equal to zero and thus the passage channel 60 is closed. If the energization is now started, the tappet 52 together with the second sealing element 64 move in the actuation direction B away from the wall section 51 and toward the second valve seat 66. As a result, the third cross-sectional area A3 increases, while the first cross-sectional area A1 decreases. Regardless of this, the second cross-sectional area A2 remains constant. Regardless of the size of the first cross-sectional area A1, the second cross-sectional area A2 and the third cross-sectional area A3, the cross-sectional area A4 of the passage channel 60 is selected so that it is always larger than at least one of the first, second and third cross-sectional areas A1, A2, A3.

For reasons of controllability, it has proven to be advantageous if the throttling is carried out with the first throttle gap $74_1$. The energization of the actuation device 49 must therefore be carried out in such a way that the second sealing element 64, together with the tappet 52, is moved as quickly as possible beyond the middle of the distance between the third valve seat 70 and the second valve seat 66. This can be achieved by an initial peak current. As soon as the second sealing element 64 is located to the left of the middle between the third valve seat 70 and the second valve seat 66 as illustrated in FIGS. 2A to 3B, the first cross-sectional area A1 of the first throttle gap $74_1$ is the smallest of the first, second and third cross-sectional area A1, A2, A3, such that the throttling of the compressed fluid is determined by the first throttle gap $74_1$.

When flowing through, the compressed fluid is throttled, the throttling being determined by the throttle gap 74 which has the smallest cross-sectional area A. Depending on how much the compressed fluid is throttled when flowing through the pressure control valve 30, the pressure in the pilot pressure chamber 12 also changes. The more it is throttled, the more the pressure in the pilot pressure chamber 12 increases. The throttling can take place continuously and depends on the strength of the energization of the actuation device 49. Since the volume flow is also influenced by the pressure control valve 30 as a result of the throttling and can be continuously adjusted, the pressure control valve 30 is designed as a proportional valve 75.

With reference to FIG. 1, the effect of the pressure in the pilot pressure chamber 12 on the slider 24 will now be explained. In the event that the pressure in the pilot pressure chamber 12 is greater than or equal to the pressure upstream of the slider 24 in the primary circuit 14, the slider 24 remains in the position shown in FIG. 1, so that the primary circuit 14 is blocked between the branch 18 and the junction 22. A fluid connection between the branch 18 and the junction 22 is only available via the secondary circuit 20. However, to facilitate the opening of the slider 24, the main orifice 28 is provided downstream of the slider 24 in the secondary circuit 20, which causes the pressure downstream of the slider 24 in the secondary circuit 20 to drop at least slightly. If, in addition, the pressure in the pilot pressure chamber 12 falls due to the above-described energization of the actuation device 49 and the throttling of the compressed fluid caused by this, the slider 24 can open and unblock the primary circuit 14 between the branch 18 and the junction 22. As mentioned, the slider 24 is designed as a proportional slider 26, which means that the slider 24 unblocks the primary circuit 14 between the branch 18 and the junction 22 to a greater or lesser extent, depending on the pressure in the pilot pressure chamber 12. Thus, the volume flow between the branch 18 and the junction 22 can be set proportionally to the pressure in the pilot pressure chamber 12 by energizing the actuation device 49.

A third operating state of the pressure control valve 30 is shown in FIG. 3C, in which no electrical energy is available for energizing the actuation device 49. In this case, the second spring 68 (see FIG. 2) returns the second sealing element 64 to the first position, in which the second sealing element 64 bears against the third valve seat 70 and closes the first passage channel 53. This intermediate position is similar to the first operating state shown in FIG. 3A.

As can be seen in particular from FIGS. 2B and 2C, according to the first exemplary embodiment, the first sealing element $54_1$ has a first surface C1 to which the compressed fluid can be applied and which points away from the wall section 51, and a second surface C2 to which the compressed fluid can be applied and which points toward the wall section 51. In this case, the second surface C2 is larger than the first surface C1. The forces acting on the first sealing element $54_1$ as a result of the pressure from the compressed fluid are not the same due to the differently sized surfaces C1, C2; rather, a resulting force directed in the actuation direction B is established, as a result of which the first sealing element $54_1$ moves in the actuation direction B. The first spring 56 is compressed until an equilibrium of forces is reached between the resulting force and the bias of the spring 56. This state is shown in FIG. 3C. It should be noted that the first sealing element $54_1$ according to the first exemplary embodiment does not differ from the first sealing element $54_2$ according to the second exemplary embodiment with regard to the first surface C1 and the second surface C2.

The first sealing element $54_2$ is consequently moved away from the first valve seat 58 so that a gap 76 opens between the wall section 51 and the first sealing element $54_2$, through which gap the compressed fluid can flow and consequently reach the low-pressure chamber 23 (arrow P3). Depending on the cross-sectional area A of this gap 76, the compressed fluid is throttled to a greater or lesser extent when it flows through the pressure control valve 30. The size of the cross-sectional area A of the gap 76 can be adjusted with the spring bias and the spring constant of the first spring 56. Consequently, even if the actuation device 49 fails, it is ensured that the slider 24 enters and the primary circuit 14 is unblocked between the branch 18 and the junction 22. As already explained, the extent to which the slider 24 enters depends on the amount of throttling. Consequently, in the event of a failure of the supply of the actuation device 49 with electrical energy, the degree to which, when and how far the slider 24 opens can be selected with the spring bias and the spring constant of the first spring 56 ("fail-safe").

From the above explanations it follows that the pressure control valve 30 according to the invention is operated as a 3/3 valve.

As mentioned, the second line 34 of the secondary circuit splits into the first sub-line 36 and the second sub-line 38 (see FIG. 1). The connected secondary orifice 42 arranged there and the check valve 40 ensure damping of the entire device 10 by absorbing pressure peaks.

Finally, it should be pointed out that the working machine 16 can be configured as a pump 78, a compressor 80 or a vibration damper 82 of a motor vehicle. In particular, in the case where the working machine 16 is designed as a vibration damper 82, it may be necessary to provide hydraulic synchronization so that regardless of the load direction of the vibration damper 82, the fluid is always conveyed in the direction shown in FIG. 1 through the primary circuit 14 and the secondary circuit 20. The device 10 according to the invention can be used for two-tube or three-tube vibration dampers 82.

LIST OF REFERENCE SYMBOLS 10 device
12 pilot pressure chamber
14 primary circuit
16 working machine
18 branch
20 secondary circuit
22 junction
23 low-pressure chamber
24 slider
25 spring
26 proportional slider
27 first control line
28 main orifice
29 second control line
30 pressure control valve
32 first line
34 second line
36 first sub-line
38 second sub-line
40 check valve
41 inlet
42 secondary orifice
43 outlet
44 magnet
46 external compressed fluid circuit
48 feed pump
49 actuation device
50 valve housing
51 wall section
52 tappet
53 first spring plate
54 first sealing element
$54_1$, $54_2$ first sealing element
56 first spring
58 first valve seat
60 passage channel
62 annular gap
64 second sealing element
66 second valve seat
67 tube
68 second spring
70 third valve seat
72 second spring plate
73 through-hole
74 throttle gap
$74_1$-$74_3$ first to third throttle gap
75 proportional valve
76 gap
77 recess
78 pump
80 compressor
82 vibration damper
84 through-opening
A cross-sectional area
A1-A4 first to fourth cross-sectional area
B actuation direction
C1 first surface
C2 second surface
$D_{RA}$ outside diameter of the tube
$D_{RI}$ inside diameter of the tube
$D_{SA}$ inside diameter of the tappet
L longitudinal axis
P1-P3 arrow

The invention claimed is:

1. A pressure control valve (30) for open-loop or closed-loop control of a pressure of a compressed fluid in a pilot pressure chamber (12), comprising
   a valve housing (50) with at least one inlet (41), which can be fluidically connected to the pilot pressure chamber (12), and at least one outlet (43),
   a wall section (51) which is permanently arranged in the pressure control valve (30) and which
      has a passage channel (60) through which the compressed fluid can flow, and
      forms a first valve seat (58),
   a tappet (52), which is mounted in the valve housing (50) so as to be movable along a longitudinal axis (L) by means of an actuation device (49) that can be energized,
   a first sealing element (54), which
      forms a second valve seat (66),
      is mounted in the valve housing (50) so as to be movable along the longitudinal axis (L) and
      is biased by means of a first spring (56) against the actuation direction (B) of the actuation device (53) into a closure position in which the first sealing element (54) bears against the first valve seat (58) and can be moved by the compressed fluid in the actuation direction (B),
   a second sealing element (64), which is secured to the tappet (52) and, by energizing the actuation device (53), can be moved by means of the tappet (52) along the longitudinal axis (L) between a first position, in which the second sealing element (64) bears against the wall section (51) and closes the passage channel (60), and a second position, in which the second sealing element (64) bears against the second valve seat (66), the second valve seat (66) being arranged axially offset to the first valve seat (58) with respect to the longitudinal axis (L), and
a second spring (68), which biases the second sealing element (64) into the first position.

2. The pressure control valve according to claim 1, characterized in that the first sealing element (54) has a first surface (C1) to which the compressed fluid can be applied and which points away from the wall section (51), and a second surface (C2) to which the compressed fluid can be applied and which points toward the wall section (51), the second surface (C2) being larger than the first surface (C1).

3. The pressure control valve (30) according to claim 1, characterized in that the second valve seat (66) is formed by a tube (67) arranged in the first sealing element (54).

4. The pressure control valve (30) according to claim 3, characterized in that the tube (67) is connected to the first sealing element (54) so as to be movable along the longitudinal axis (L).

5. The pressure control valve (30) according to claim 1, characterized in that the passage channel (60) is formed by an annular gap (62) between the wall section (51) and the tappet (52).

6. The pressure control valve (30) according to claim 1, characterized in that the wall section (51) has a through-hole (73) through which the compressed fluid can flow and which cannot be closed by the first sealing element (54).

7. The pressure control valve (30) according to claim 1, characterized in that the cross-sectional area of the passage channel or of the annular gap is larger than the cross-sectional area of a throttle gap (74) starting at the second sealing element (64).

8. The pressure control valve (30) according to claim 7, characterized in that the cross-sectional area (A4) of the annular gap (62) is larger than the cross-sectional area (A1, A2, A3)
of the first throttle gap ($74_1$) formed between the second sealing element (64) and the second valve seat (66), or between the tappet (52) and the valve seat (66), or
of the second throttle gap ($74_2$) formed between the second sealing element (64) and the first sealing element, or
of the third throttle gap ($74_3$) formed between the second sealing element (64) and the wall section.

9. The pressure control valve (30) according to claim 1, characterized in that the pressure control valve (30) is designed as a proportional valve (75).

10. The pressure control valve (30) according to claim 1, characterized in that the wall section (51) is designed as a first spring plate (53) and/or the second sealing element (64) is designed as a second spring plate (72).

11. The pressure control valve (30) according to claim 1, characterized in that the second sealing element (64) is connected to the tappet (52) by means of a clearance fit.

12. The pressure control valve (30) according to claim 10 characterized in that the second spring plate (72) is press-fit on the tappet (52).

13. The pressure control valve (30) according to claim 1, characterized in that the actuation device (53) comprises a magnet (44) through which the compressed fluid can flow.

14. A device for open-loop and closed-loop control of a pressure in a pilot pressure chamber (12), comprising
a primary circuit (14) for a compressed fluid,
a working machine (16) arranged in the primary circuit (14) for conveying the compressed fluid in the primary circuit (14) along a conveying direction,
a hydraulic or pneumatic slider (24),
a secondary circuit (20) for the compressed fluid,
which starts at a branch (18) of the primary circuit (14), which branch is arranged downstream of the working machine (16) with respect to the conveying direction, and
which flows back into the primary circuit (14) at a junction (22),
a pilot pressure chamber (12) arranged in the secondary circuit (20), and
a pressure control valve (30) according to claim 1, arranged between the pilot pressure chamber (12) and the junction (22) in the secondary circuit (20), wherein
the slider (24) is arranged and designed so that the slider (24) can block or unblock the flow of the compressed fluid in the primary circuit (14) between the branch (18) and the junction (22) depending on the pressure in the pilot pressure chamber (12).

15. The device according to claim 14, characterized in that the slider (24) is designed as a proportional slider (26).

16. The device according to claim 14, characterized in that the actuation device (53) of the pressure control valve (30) comprises a magnet (44), through which the compressed fluid can flow and that the magnet (44) is fluidically connected to the pilot pressure chamber (12) or to an external compressed fluid circuit (46).

17. The device according to claim 14, characterized in that the working machine (16) is a pump (78), a compressor (80) or a vibration damper (82).

* * * * *